United States Patent [19]
Tanaka et al.

[11] Patent Number: 4,764,964
[45] Date of Patent: Aug. 16, 1988

[54] SIGNAL PROCESSING APPARATUS

[75] Inventors: Yutaka Tanaka; Osamu Matsunaga, both of Kanagawa, Japan

[73] Assignee: Sony Corporation, Tokyo, Japan

[21] Appl. No.: 51,911

[22] Filed: May 19, 1987

[30] Foreign Application Priority Data

May 20, 1986 [JP] Japan .................................. 61-115032

[51] Int. Cl.$^4$ ............................................. H04N 9/78
[52] U.S. Cl. .................................................... 358/31
[58] Field of Search .......................................... 358/31

[56] References Cited

U.S. PATENT DOCUMENTS

| | | | |
|---|---|---|---|
| 4,096,516 | 6/1975 | Pritchard | 358/31 |
| 4,245,238 | 1/1981 | Fuhrer | 358/31 |
| 4,355,333 | 10/1982 | Sato | 358/31 |
| 4,365,266 | 12/1982 | Lagoni | 358/31 |
| 4,524,382 | 6/1985 | Tanaka et al. | 358/31 |
| 4,626,895 | 12/1986 | Reitmeier | 358/31 |
| 4,636,840 | 1/1987 | McNeely et al. | 358/31 |

FOREIGN PATENT DOCUMENTS

| | | | |
|---|---|---|---|
| 57-95788 | 6/1982 | Japan . | |
| 39185 | 3/1984 | Japan | 358/31 |

Primary Examiner—John W. Shepperd
Attorney, Agent, or Firm—Philip M. Shaw, Jr.

[57] ABSTRACT

A signal processing apparatus comprising a plurality of video signal correlation detecting means for detecting the values of video signal correlations in a plurality of ways with respect to the displayed picture, and intermediate value selecting means for selecting an intermediate value among the detected values of the plurality of video signal correlations, whereby a changing video signal is processed by utilizing a correlation of a proper way.

9 Claims, 8 Drawing Sheets

SIGNAL PROCESSING APPARATUS

TECHNICAL FIELD

The present invention relates to a video signal processing apparatus utilizing the principle of signal correlation to separate the luminance and chrominance signals.

BACKGROUND ART

In prior art video signal separating systems, it is known to utilize horizontal correlation, vertical correlation and time (frame) correlation of both the luminance signal Y and a carrier chrominance signal (chroma signal) C to separate them. Correlation is meant how the signals change along a line, from line to line, or from frame to frame, respectively. Known Y/C separating circuits utilizing the above respective correlations will hereinafter be described with reference to FIGS. 8 to 10.

FIG. 8A illustrates a horizontal correlation type Y/C separating circuit. Referring to FIG. 8A, a video signal applied to an input terminal 1 is supplied in common to a low pass filter 2Y and a bandpass filter 2C. From an output of the low pass filter 2Y, a luminance signal $Y_H$ is supplied to an output terminal 3Y, whereas from an output of the bandpass filter 2C, a chroma signal $C_H$ is supplied to an output terminal 3C.

FIG. 8B illustrates a vertical correlation type Y/C separating circuit. Referring to FIG. 8B, a video signal applied to an input terminal 1 is supplied in common to a 1H delay line 4, an adder 5Y and a subtracter 5C. The output from the 1H delay line 4 is supplied in common to the adder 5Y and the subtracter 5C. As a result, a luminance signal $Y_V$ from the adder 5Y is supplied to an output terminal 6Y and a chroma signal $C_V$ from the subtracter 5C is supplied to an output terminal 6C.

FIG. 8C illustrates a frame correlation type Y/C separating circuit. Referring to FIG. 8C, a video signal applied to an input terminal 1 is supplied in common to an adder 8Y, a subtracter 8C and a frame memory 7 which constitutes a one frame delay line. The output of the frame memory 7 is supplied to the adder 8Y and the subtracter 8C. As a result, a luminance signal $Y_F$ from the adder 8Y is supplied to an output terminal 9Y and a chroma signal $C_F$ from the subtracter 8C is supplied to an output terminal 9C.

While the frame memory 7 is inherently designed to process a digitized signal, it is arranged in the circuit of the invention so as to process an analog signal for the sake of simplicity. Therefore, an A/D (analog-to-digital) converter at the input side thereof and a D/A (digital-to-analog) converter at the output side thereof are not shown but are understood to be included.

FIGS. 9A to 9C illustrate frequency vs. amplitude characteristics of the Y/C separating circuits shown in FIGS. 8A to 8C, respectively.

In FIG. 9A, a bold solid curve indicates the pass band characteristic of the low pass filter 2Y and a dashed curve the pass band characteristic of the bandpass filter 2C. In FIG. 8A, the low pass filter 2Y can be replaced by a subcarrier trap. In this case, the pass band characteristic is indicated as both bold and fine solid curves in FIG. 9A.

The vertical correlation type Y/C separating circuit of FIG. 8B constitutes a known comb filter. The pass band characteristic of this comb filter relative to the luminance signal $Y_V$ is made, as shown by a solid curve in FIG. 9B, to have the maximum attenuation degree at a subcarrier frequency fsc and respective points spaced apart therefrom by the distance of some integer times the horizontal frequency $f_H$ and the minimum attenuation degree at each of intermediate points between these points, i.e. at each of the points spaced apart from the subcarrier frequency fsc by the distance of an odd number times ½ of the horizontal frequency $f_H$: $(2n+1) f_H/2$. On the other hand, the pass band characteristic thereof relative to the chroma signal $C_V$ is made, as shown by a dashed curve in FIG. 9B, to have a minimum attenuation degree at the subcarrier frequency fsc and respective points spaced apart therefrom by the distance of some integer times the horizontal frequency $f_H$ and a maximum attenuation degree at each of the points spaced apart from the subcarrier frequency fsc by the distance of an odd number times the horizontal frequency $f_H$, i.e. $(2n+1) f_H/2$.

The reason for this is that by the known technique of frequency interleaving, as shown by dashed line in FIG. 10A, the spectrums of the chroma signal C are located between the spectrums of the luminance signal Y shown by a solid line in the same figure.

The frame correlation type Y/C separating circuit of FIG. 8C forms a known comb filter. The pass band characteristic of this comb filter relative to the luminance signal $Y_F$ is made, as shown by a solid curve in FIG. 9C, to have the maximum attenuation degree at the subcarrier frequency fsc and respective points spaced apart by the distance of some integer times the frame frequency $f_F (=f_V/2)$ and the minimum attenuation degree at each of the intermediate points between these points, that is, points spaced apart from the subcarrier frequency fsc by the distance of an odd number times ½ of the frame frequency $f_F$, i.e. $(2n+1) f_F/2$. On the other hand, the pass band characteristic thereof relative to the chroma signal $C_F$ is made, as shown by a dashed line in FIG. 9C, to have the minimum attenuation degree at the subcarrier frequency fsc and respective points spaced apart therefrom by the distance of some integer times the frame frequency $f_F$ and the maximum attenuation degree at respective points spaced apart from the subcarrier frequency fsc by the distance of odd times of ½ of the frame frequency $f_F$, i.e. $(2n+1) f_F/2$.

The reason for this will be understood as follows. As shown in FIG. 10B, which is a partially enlarged view of FIG. 10A, by the known technique of frequency interleaving, a side band wave (shown by an open circle) of the vertical frequency $f_V$ accompanied with an odd higher harmonic wave of the horizontal frequency $f_H$ and a side band wave (shown by a solid circle) of the vertical frequency $f_V$ accompanied with an even higher harmonic wave are spaced apart from each other by a distance of the frame frequency $f_F=f_V/2$. Then, the subcarrier frequency fsc and the side band wave of the vertical frequency $f_V$ accompanied therewith are located between the frequency intervals of the frame frequency $f_F$.

However, these known Y/C separating apparatus, individually utilizing various correlations, cause the quality of the reproduced picture to be deteriorated at the places when no correlation exists.

When horizontal correlation is utilized, the deterioration of the quality of picture, such as the deterioration of a frequency characteristic and the occurrence of crosstalk, occurs on the picture at its right and left side edges of the longitudinal stripes as shown in FIG. 11A when the levels of the luminance signal Y and the chroma signal C are changed abruptly in the horizontal direction.

When vertical correlation is utilized, the deterioration of the quality of picture, such as the occurrence of crosstalk and the appearance of dots of the subcarrier, occurs on the picture at the top and bottom edges of the horizontal stripes as shown in FIG. 11B when the levels of the luminance signal Y and the chroma signal C are abruptly changed in the vertical direction.

When frame correlation is utilized, as shown in FIGS. 11C1 to 11C3, crosstalk occurs in part or wholly in the peripheral edge of the picture in relation to the direction in which a figure in the picture is moved in the directions shown by arrows and also the quality of picture is considerably deteriorated, such as multiple-line interference or the like when the peripheral edge of the figure is doubled or tripled.

In order to solve such problems, it may be proposed to switch the separated outputs in response to the moving amount of the picture element at a proper timing. In this case, the signal processing apparatus needs a moving picture element detecting section which would cause the arrangement of the apparatus to be large in size and complicated.

DISCLOSURE OF INVENTION

It is therefore an object of this invention to provide a video signal luminance and chrominance signal separating apparatus which can improve the quality of a reproduced picture without requiring a moving picture element detecting section.

This is accomplished in the present invention by providing a signal processing apparatus comprising a plurality of video signal correlation detecting means for detecting the values of video signal correlations in a plurality of directions with respect to the displayed picture, and intermediate value selecting means for selecting an intermediate value among the detected values of the plurality of video signal correlations, whereby a changing video signal is processed by utilizing a correlation of a proper direction.

According to the present invention, the changing video signal can be processed by the correlation of the proper direction without detecting a moving image of the displayed picture, so that the quality of the reproduced picture can be improved.

The foregoing and other objectives, features and advantages of the invention will be more readily understood upon consideration of the following detailed description of certain preferred embodiments of the invention, taken in conjunction with the accompanying drawings.

BRIEF DESCRIPTION OF DRAWINGS

FIGS. 11A to 11C3 are respectively conceptual diagrams showing reproduced pictures of the prior art Y/C separating circuits.

BEST MODE FOR CARRYING OUT THE INVENTION

An embodiment of a signal processing apparatus according to the present invention will hereinafter be described with reference to FIGS. 1 and 2 where this embodiment is applied to the process of Y/C separating.

Figure 1:
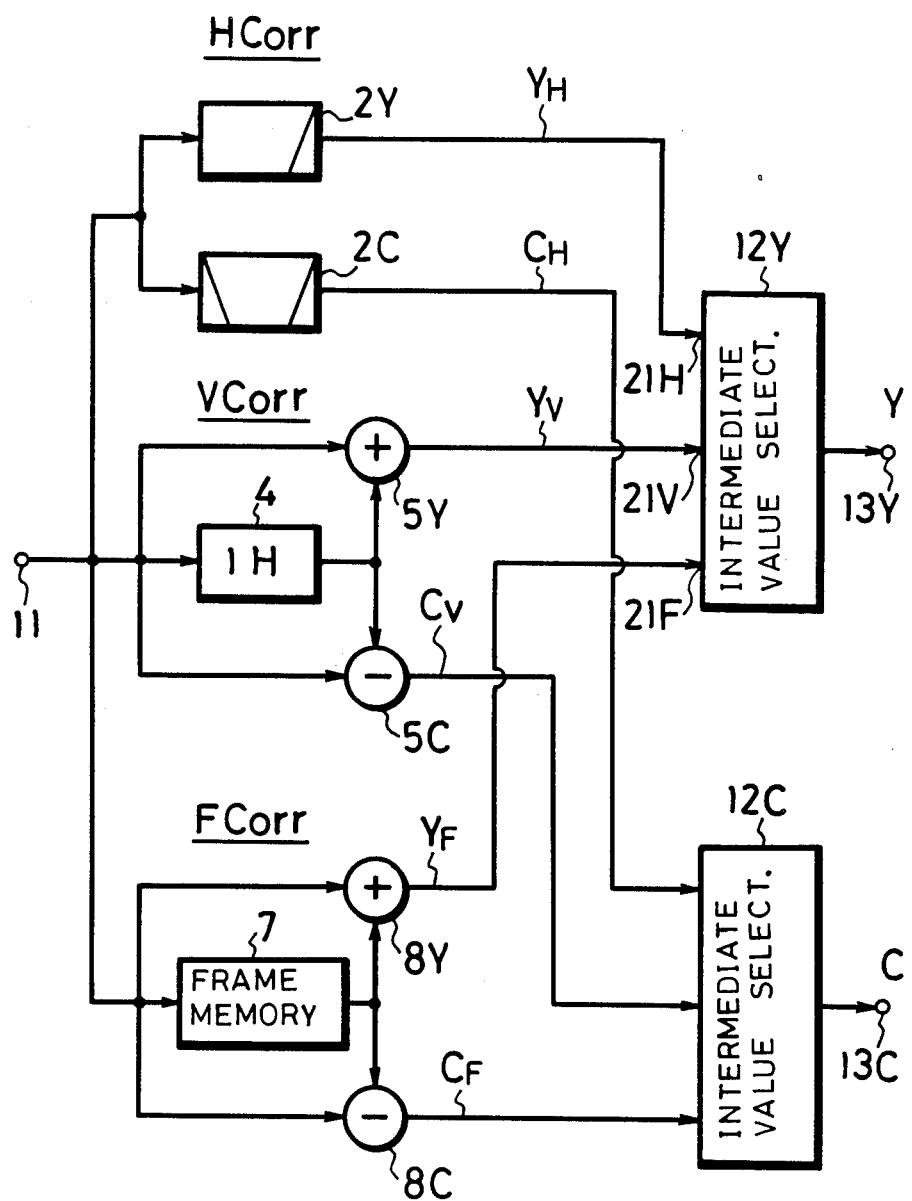
FIG. 1 is a block diagram showing a circuit arrangement of one embodiment in which a signal processing apparatus of the invention is applied to a Y/C separation.

FIG. 1 illustrates a circuit arrangement of the embodiment of the invention. In FIG. 1, like parts corresponding to those of FIG. 8 are marked with the same references and therefore they are not further described.

Figure 8A:
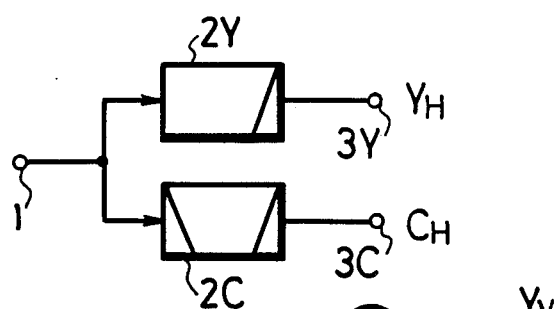
FIGS. 8A to 8C are respectively block diagrams showing circuit arrangements of prior art Y/C separating circuits.
Figure 8B:
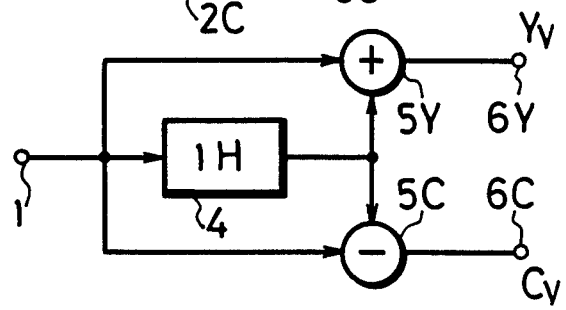
Figure 8C:
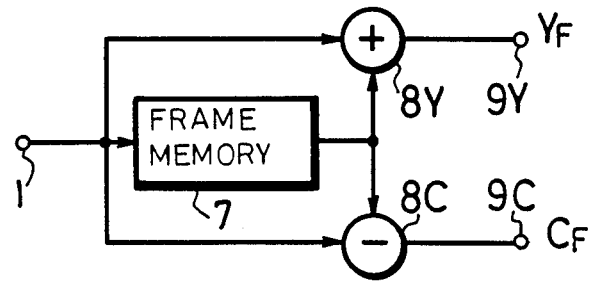
Figure 9A:
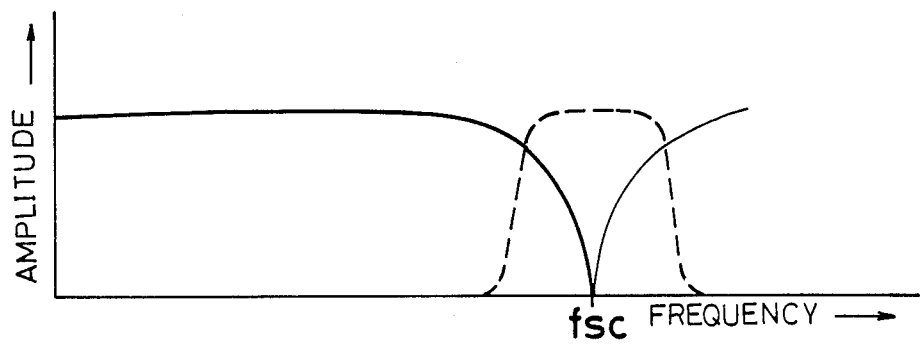
FIGS. 9A to 9C are respectively graphs showing frequency vs. amplitude characteristics of the prior art Y/C separating circuits in FIGS. 8A to 8C.
Figure 9B:
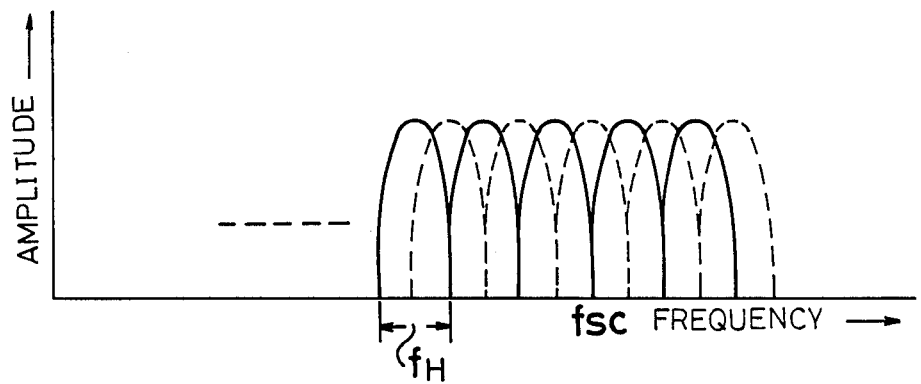
Figure 9C:
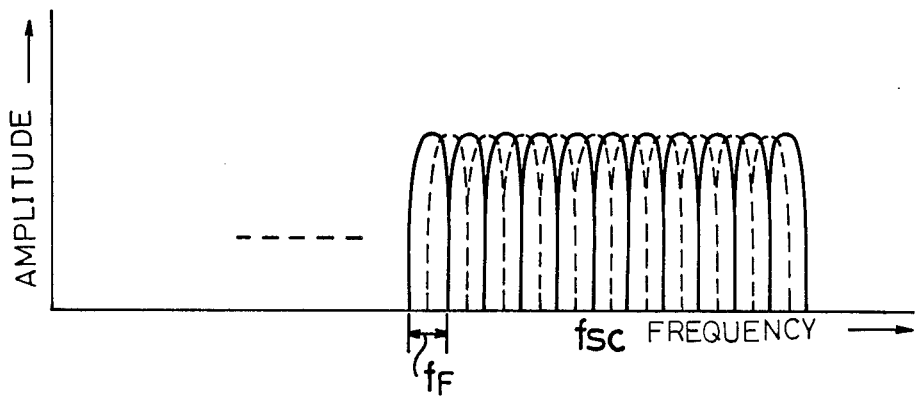
Figure 10A:
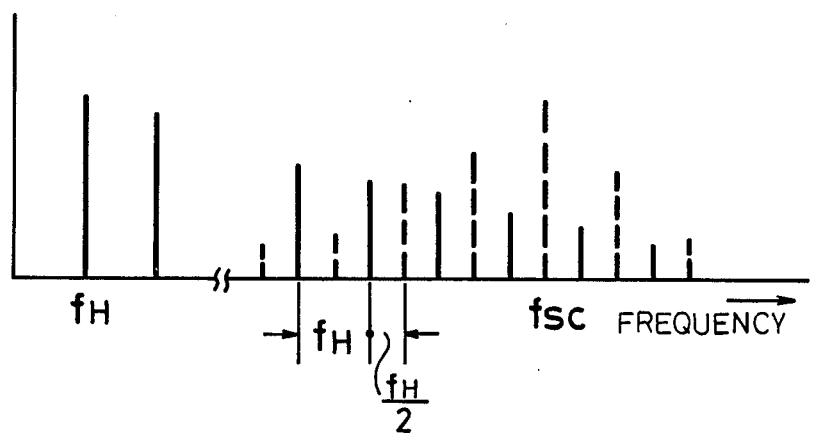
FIGS. 10A and 10B are spectral diagrams of a video signal used to explain the present invention.
Figure 10B:
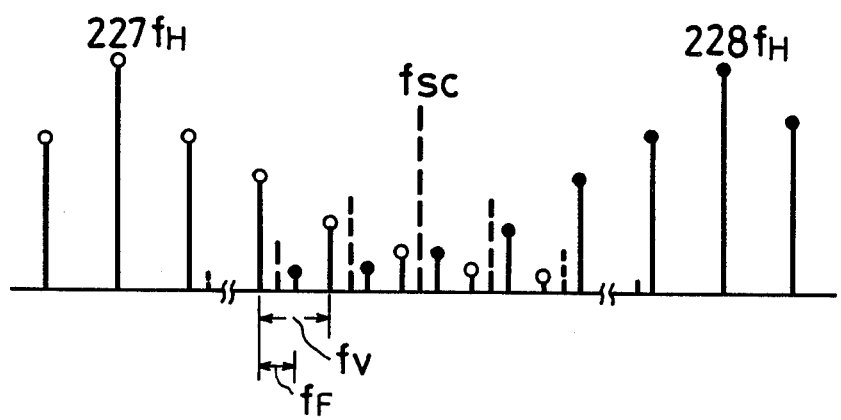

Referring to FIG. 1, there are provided a horizontal correlation type Y/C separating circuit H Corr, a vertical correlation type Y/C separating circuit V Corr and a frame correlation type Y/C separating circuit F Corr which are constructed as shown in FIGS. 8A, 8B and 8C, respectively. A video signal applied to an input terminal 11 is supplied in common to these Y/C separating circuits H Corr, V Corr and F Corr. Further, there are provided intermediate value selecting circuits 12Y and 12C.

The intermediate value selecting circuit 12Y is supplied with output signals $Y_H$, $Y_V$ and $Y_F$ of the low pass filter 2Y and both adders 5Y and 8Y, respectively. The other intermediate value selecting circuit 12C is supplied with output signals $C_H$, $C_V$ and $C_F$ of the low pass filter 2C and both subtracters 5C and 8C, respectively.

Figure 2:
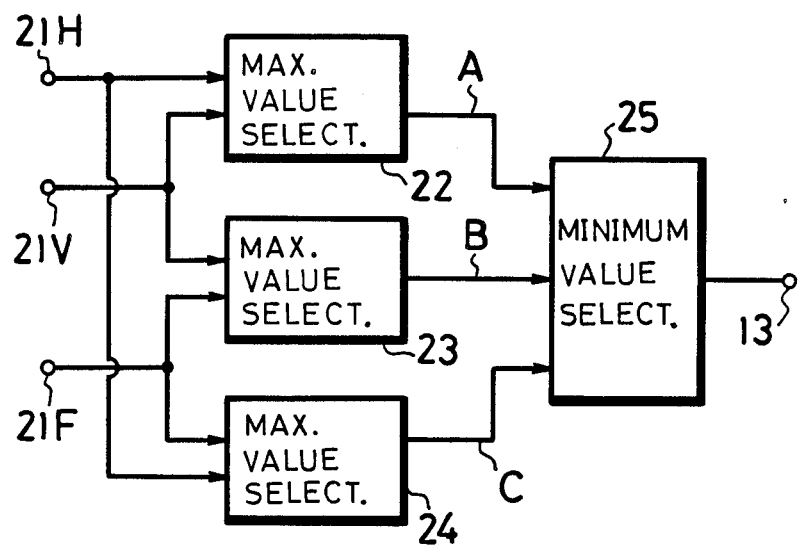
FIGS. 2 and 3 are respectively block diagrams showing the arrangement of main portions of the embodiment in FIG. 1.

FIG. 2 illustrates an example of the circuit arrangement of each of the intermediate value selecting circuits 12Y and 12C. Input terminals 21H, 21V and 21F, respectively, receive the outputs of the Y/C separating circuits H Corr, V Corr and F Corr of FIG. 1 at input terminals 21H, 21V, and 21F, respectively. Maximum value selecting circuits 22, 23 and 24 are connected such that an input signal from the input terminal 21H is supplied to the third and first maximum value selecting circuits 24 and 22, respectively, an input signal from the input terminal 21V is supplied to the first and second maximum value selecting circuits 22 and 23, respectively, and an input signal from the input terminal 21F is supplied to the second and third maximum value selecting circuits 23 and 24, respectively. The outputs A, B, C, respectively, of the first to third maximum value selecting circuits 22 to 24 are all supplied to a minimum value selecting circuit 25 and the output from the minimum value selecting circuit 25 is delivered to a terminal 13.

The operation of the intermediate value selecting circuit of FIG. 2 will be described next.

Let it now be assumed that the amplitudes of the luminance signals $Y_H$, $Y_V$ and $Y_F$ supplied from the respective Y/C separating circuits H Corr, V Corr and F Corr of FIG. 1 to the respective input terminals 21H, 21V and 21F of the intermediate value selecting circuit of, for example, $Y_H > Y_V > Y_F$.

Then, the luminance signals $Y_H$ and $Y_V$ are supplied to the first maximum value selecting circuit 22, so that the luminance signal $Y_H$, which has an amplitude larger than that of the luminance signal $Y_V$, appears at the output A of the circuit 22. The second maximum value selecting circuit 23 is supplied with the luminance signals $Y_V$ and $Y_F$, so that the luminance signal $Y_V$, having an amplitude larger than that of the luminance signal $Y_F$, appears at the output B of the circuit 23. Further, the third maximum value selecting circuit 24 is supplied with the luminance signals $Y_F$ and $Y_H$, so that the luminance signal $Y_H$, having an amplitude larger than that of the luminance signal $Y_F$, appears at the output C of the circuit 24.

Since the minimum value selecting circuit 25 is supplied with the outputs A, B and C, i.e. the luminance signals $Y_H$, $Y_V$ and $Y_H$ from the maximum value selecting circuits 22 to 24, it generates the luminance signal $Y_V$, which has the smallest amplitude. Since the condition of $Y_H > Y_V > Y_F$ is satisfied, the intermediate value $Y_V$ is thus selected by the circuit arrangement of FIG. 2.

If the condition of three luminance signals $Y_H$, $Y_V$ and $Y_F$ is different from that described above, the intermediate value selecting circuit of FIG. 2 operates to produce outputs as shown in the table 1 below. Under all conditions the intermediate value among three luminance signals $Y_H$, $Y_V$ and $Y_F$ is selected by the intermediate value selecting circuit.

TABLE 1

| Case | A | B | C | Output (13) |
|---|---|---|---|---|
| $Y_H > Y_V > Y_F$ | $Y_H$ | $Y_V$ | $Y_H$ | $Y_V$ |
| $Y_F > Y_V > Y_H$ | $Y_V$ | $Y_F$ | $Y_F$ | $Y_V$ |
| $Y_V > Y_H > Y_F$ | $Y_V$ | $Y_V$ | $Y_H$ | $Y_H$ |
| $Y_F > Y_H > Y_V$ | $Y_H$ | $Y_F$ | $Y_F$ | $Y_H$ |
| $Y_H > Y_F > Y_V$ | $Y_H$ | $Y_F$ | $Y_H$ | $Y_F$ |
| $Y_V > Y_F > Y_H$ | $Y_V$ | $Y_V$ | $Y_F$ | $Y_F$ |

If the amplitudes of two input signals applied to each of the maximum value selecting circuits 22 to 24 are equal to each other, either one of them may be selected. In this case, the intermediate value selecting circuit of FIG. 2 never selects a third input signal and the relationships indicated in the table 1 are established.

The intermediate value selecting circuit 12C, which is also illustrated in FIG. 2, is operated relative to the chroma signals $C_H$, $C_V$ and $C_F$ in the same way as described above for the circuit 12Y.

Figure 11A:
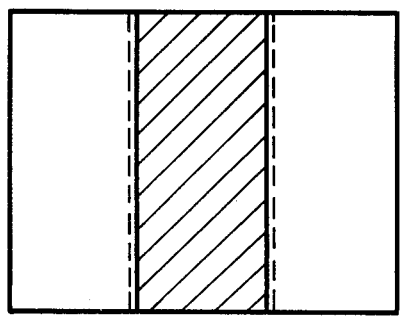
Figure 11B:
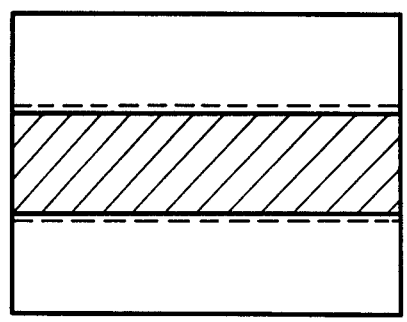
Figure 11B:
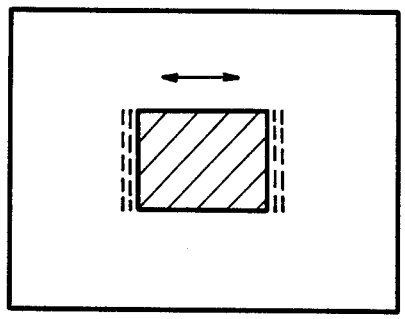
Figure 11B:
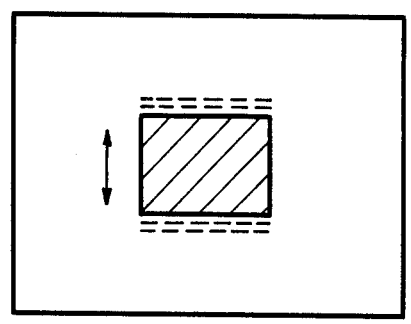
Figure 11B:
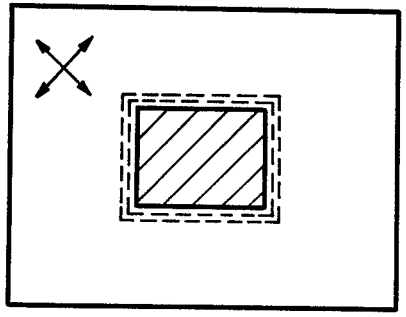

The operation of the embodiment shown in FIG. 1 will now be described. The picture shown in FIG. 11A has the correlation in the vertical direction, i.e. the displayed image is relatively constant in the vertical direction. Conversely, the picture shown in FIG. 11B has the correlation in the horizontal direction. Further, correlations in the frame (time) directions appear in the still pictures shown in FIGS. 11C1 to 11C3, i.e. some part of the picture remains relatively constant from frame to frame.

When the picture has a correlation in any of the horizontal, vertical and time directions, there is a large probability that of the outputs from the Y/C separating circuits H Corr, V Corr and F Corr of FIG. 1, the output corresponding to the direction having the correlation will become an intermediate value while the output corresponding to the direction having no correlation becomes either larger or smaller than the output corresponding to the correlation. For this reason, according to the embodiment of FIG. 1, the intermediate value selecting circuit 12Y selects the luminance signal Y corresponding to the way in which the picture has correlation. At the same time, the other intermediate value selecting circuit 12C selects the chroma signal C corresponding to the way in which the picture has the correlation. Thus, the optimum Y/C separation for various pictures which are being changed at any time is carried out, so that the quality of the reproduced picture is improved.

Figure 3:
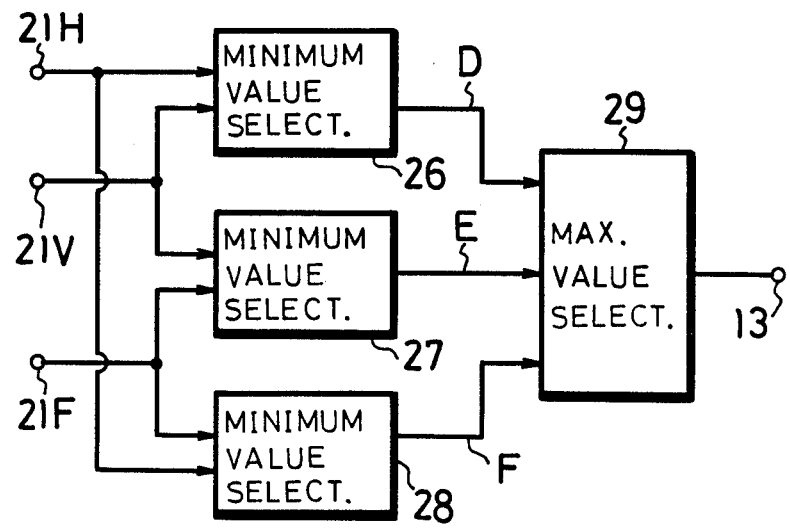

Alternatively, as shown in FIG. 3, the intermediate value selecting circuits 12Y or 12C can be constructed by replacing the maximum value selecting circuits 22, 23 and 24 of FIG. 2 with minimum value selecting circuits 26, 27 and 28 and by replacing the minimum value selecting circuit 25 of FIG. 2 with a maximum value selecting circuit 29. The outputs D, E and F correspond to the outputs of the circuits 26, 27 and 28, respectively.

Relative to the level relationships of the three luminance signals $Y_H$, $Y_V$ and $Y_F$, the intermediate value selecting circuit of FIG. 3 is operated in accordance with table 2 below. This intermediate value selecting circuit is operated in the same way relative to the chroma signals $C_H$, $C_V$ and $C_F$.

TABLE 2

| Case | A | B | C | Output (13) |
|---|---|---|---|---|
| $Y_H > Y_V > Y_F$ | $Y_V$ | $Y_F$ | $Y_F$ | $Y_V$ |
| $Y_F > Y_V > Y_H$ | $Y_H$ | $Y_V$ | $Y_H$ | $Y_V$ |
| $Y_V > Y_H > Y_F$ | $Y_H$ | $Y_F$ | $Y_F$ | $Y_H$ |
| $Y_F > Y_H > Y_V$ | $Y_V$ | $Y_V$ | $Y_H$ | $Y_H$ |
| $Y_H > Y_F > Y_V$ | $Y_V$ | $Y_V$ | $Y_F$ | $Y_F$ |
| $Y_V > Y_F > Y_H$ | $Y_H$ | $Y_F$ | $Y_H$ | $Y_F$ |

When the levels of two input signals applied to the minimum value selecting circuits 26 to 28 are equal to each other, the intermediate value selecting circuit of FIG. 3 never selects a third input and the relationships indicated on the table 2 are established.

Other embodiments of the signal processing apparatus according to the present invention will now be described with reference to FIGS. 4 and 5 in which this embodiment is applied to the Y/C separation.

Figure 4:
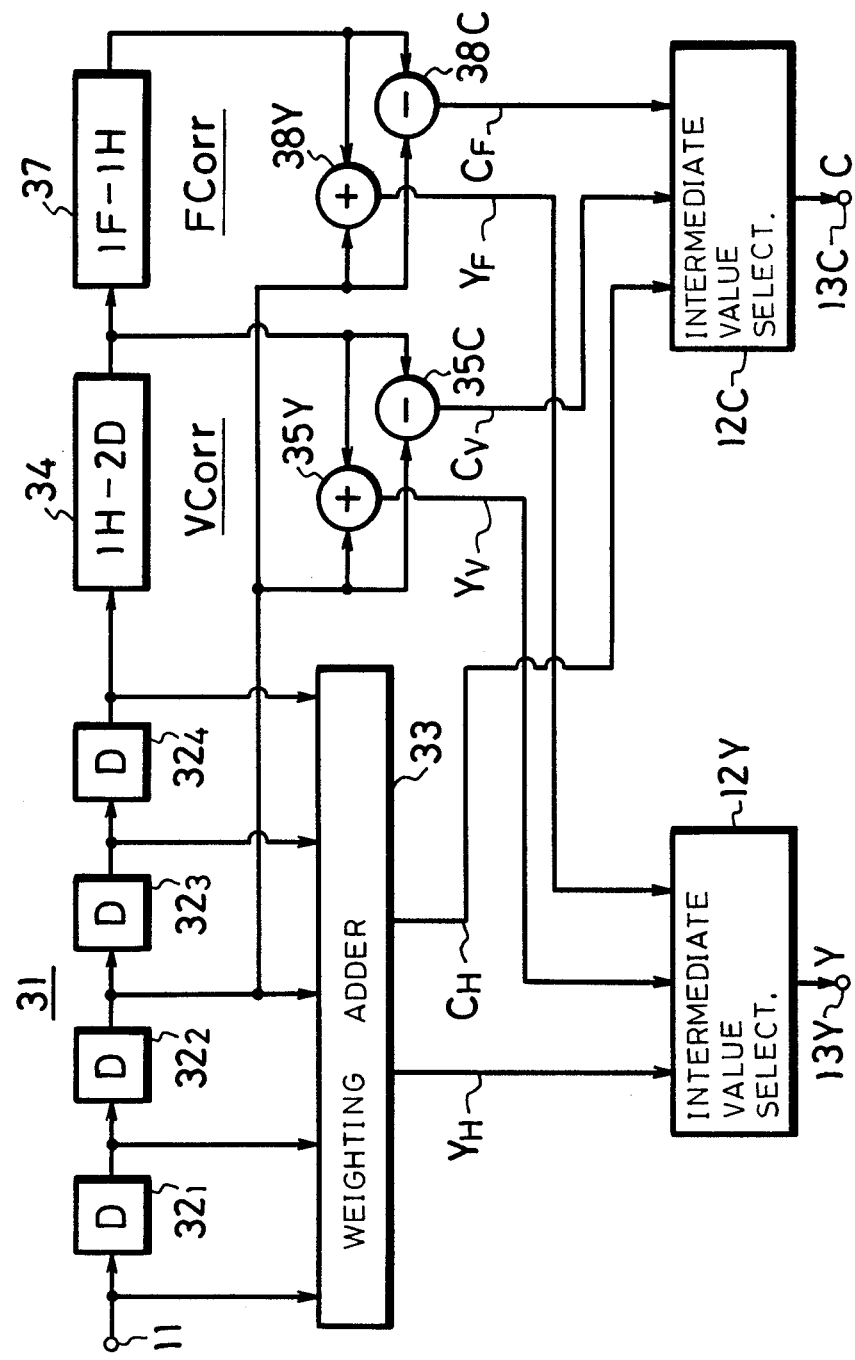
FIG. 4 is a block diagram showing a circuit arrangement of another embodiment in which the present invention is applied to the Y/C separation.

FIG. 4 illustrates a circuit arrangement of another embodiment of the signal processing apparatus according to this invention. In FIG. 4, like parts corresponding to those of FIG. 1 are marked with the same reference numerals and their description will be omitted.

Referring to FIG. 4, a transversal filter 31 is provided to include four unit delay lines $32_1$, $32_2$, $32_3$ and $32_4$ connected in series and a weighting adding circuit 33. The input side of the first unit delay line $32_1$, each of junctions between adjacent ones of the first to fourth unit delay lines $32_1$ to $32_4$ and the output side of the fourth unit delay line $32_4$ are connected to the weighting adding circuit 33. The transversal filter 31 is equivalent to the horizontal correlation type Y/C separating circuit H Corr which is formed of the low pass filter 2Y and the bandpass filter 2C as shown in FIG. 1 and is operated at a clock frequency of, for example, 4 fsc. Each of the unit delay lines $32_1$ to $32_4$ has a delay time D.

In the transversal filter 31, the output from the fourth unit delay line $32_4$ is supplied to a first memory 34. The output from the first memory 34 is supplied in common to an adder 35Y and a subtracter 35C, whereas an output developed at the junction between the second and third unit delay lines $32_2$ and $32_3$ is supplied in common to the adder 35Y and the subtracter 35C. The delay time of the first memory 34 is selected to be 1H-2D. This memory 34 and the third and fourth unit delay line $32_3$ and $32_4$ of the transversal filter 31 constitute a line memory whose delay time is selected as 1H. The line memory, the adder 35Y and the subtracter 35C constitute the vertical correlation type Y/C separating circuit V Corr.

The output from the first memory 34 is supplied to a second memory 37 and the output of this second memory 37 is supplied in common to a second adder 38Y and a second subtracter 38C. The output developed at the junction between the second and third unit delay lines $32_2$ and $32_3$ of the transversal filter 31 is supplied in common to the adder 38Y and the subtracter 38C. The second memory 37 has a delay time of 1F-1H. The second memory 37, the first memory 34 and the third and fourth unit delay lines $32_3$ and $32_4$ of the transversal filter 31 constitute a frame memory of which the delay time is selected to be 1F (one frame period). This frame memory, the second adder 38Y and the second subtracter 38C constitute the frame correlation type Y/C separating circuit F Corr.

The intermediate value selecting circuit 12Y is supplied with the outputs $Y_H$, $Y_V$ and $Y_F$ of the transversal filter 31 and both the adders 35Y and 38Y, respectively. The other intermediate value selecting circuit 12C is supplied with the outputs $C_H$, $C_V$ and $C_F$ of the transversal filter 31 and both the subtracters 35C and 38C, respectively.

Figure 5:
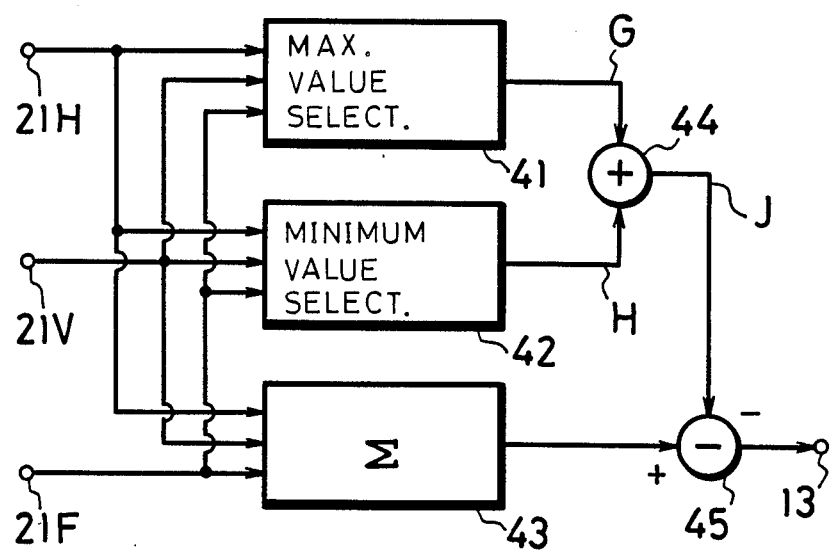
FIG. 5 is a block diagram showing an arrangement of a main portion of the embodiment shown in FIG. 4.

FIG. 5 illustrates an example of the circuit arrangement of each of the intermediate value selecting circuits 12Y and 12C according to this embodiment. Input signals applied to input terminals 21H, 21V and 21F are supplied in common to a maximum value selecting circuit 41, a minimum value selecting circuit 42 and an adder 43. Outputs G and H from the maximum value selecting circuit 41 and the minimum value selecting circuit 42, respectively, are supplied to a second adder 44. The output from the first adder 43 is supplied to a subtracter 45 and an output J from the second adder 44 is supplied to the subtracter 45 in which the output J is subtracted from the output of the adder 43.

Relative to 6 levels of relationships among three luminance signals $Y_H$, $Y_V$ and $Y_F$, the intermediate value selecting circuit of FIG. 5 is operated in accordance with the following table 3. This intermediate value selecting circuit is operated in the same way relative to the chroma signals $C_H$, $C_V$ and $C_F$.

TABLE 3

| Case | G | H | J | Output (13) |
|---|---|---|---|---|
| $Y_H > Y_V > Y_F$ | $Y_H$ | $Y_F$ | $Y_H + Y_F$ | $Y_V$ |
| $Y_F > Y_V > Y_H$ | $Y_F$ | $Y_H$ | $Y_H + Y_F$ | $Y_V$ |
| $Y_V > Y_H > Y_F$ | $Y_V$ | $Y_F$ | $Y_V + Y_F$ | $Y_H$ |
| $Y_F > Y_H > Y_V$ | $Y_F$ | $Y_V$ | $Y_V + Y_F$ | $Y_H$ |
| $Y_H > Y_F > Y_V$ | $Y_H$ | $Y_V$ | $Y_H + Y_V$ | $Y_F$ |
| $Y_V > Y_F > Y_H$ | $Y_V$ | $Y_H$ | $Y_H + Y_V$ | $Y_F$ |

Even when two out of three input signals are equal to each other in level, the relationships in the table 3 are established.

The intermediate value selecting circuit shown in FIG. 5 together with the horizontal correlation type and frame correlation type Y/C separating circuits H Corr and F Corr of FIG. 4 are formed of digital circuits. This is also true for the intermediate value selecting circuits which are constructed fundamentally as shown in FIGS. 2 and 3.

In this way, the embodiment of FIG. 4 is operated in the same way as that of the embodiment of FIG. 1, so that for a picture changing at any time, the luminance signal Y and the chroma signal C in the way in which the picture has correlation are selected to thereby carry out the optimum Y/C separation, thus improving the quality of a reproduced picture.

A further embodiment of the signal processing apparatus according to the present invention will be described with reference to FIG. 6 in which this embodiment is applied to a noise eliminating circuit. A noise eliminating circuit 50 comprises horizontal, vertical and frame correlation detecting circuits 51, 52 and 53 and an intermediate value selecting circuit 54 which is supplied with the outputs from these correlation detecting circuits 51 to 53. The correlation detecting circuits 51 to 53 correspond to the signal separating circuits described above and generate signals of the same kind as that of the aforementioned luminance signals $Y_H$, $Y_V$ and $Y_F$. Further, the intermediate value selecting circuit 54 is constructed as shown in FIG. 2, FIG. 3 or FIG. 5.

In the embodiment shown in FIG. 1 or FIG. 4, for one of the luminance signal Y and the chroma signal C, the other signal to be separated may be noise. Further, since the video signal has correlation and the noise has no correlation, it will be easily understood that the noise eliminating circuit of this embodiment is operated in the same way as that of the Y/C separating circuit shown in FIG. 1 or FIG. 4 to thereby separate the video signal and the noise. In other words, it will be easily understood that the noise can be eliminated from the video signal.

Figure 6:
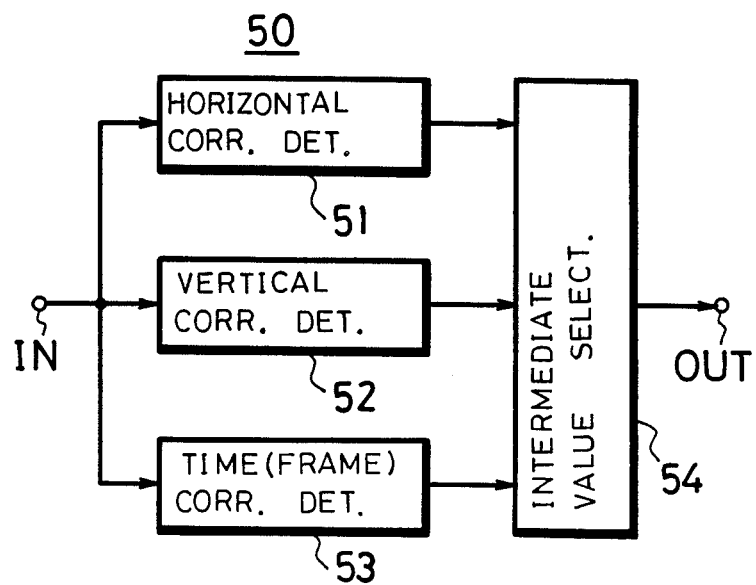
FIG. 6 and FIGS. 7A and 7B are respectively block diagrams showing arrangements of further embodiments in which the present invention is applied to a noise elimination.
Figure 7A:
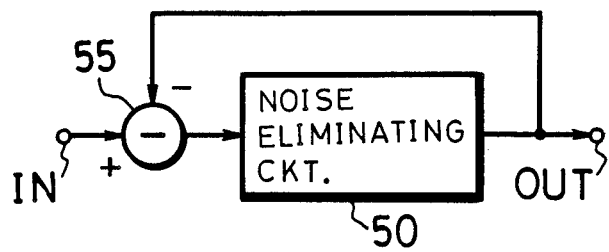

As shown in FIG. 7A, a noise eliminating apparatus of a recursive type may be comprised of the noise eliminating circuit 50 of the embodiment shown in FIG. 6 and a subtracter 55.

Figure 7B:
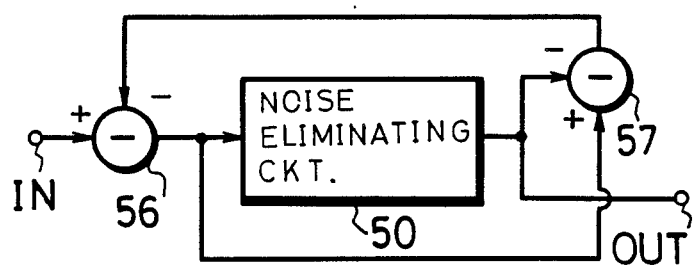

Further, as shown in FIG. 7B, a first subtracter 56 is connected to the input side of the noise eliminating circuit 50 and a second subtracter 57 is connected to the output side of the circuit 50. The second subtracter 57 subtracts the output signal (which hardly contains any noise) of the noise eliminating circuit 50 from the input signal (which does contain the noise) to the noise eliminating circuit 50 to thereby separate the noise component from the video signal. Then, the noise component separated, which is obtained from the output of the subtracter 57, is subtracted by the subtracter 56 connected to the input side of the noise eliminating circuit 50 to thereby eliminate the noise contained in the input signal applied to the noise eliminating circuit 50. Thus, the S/N (signal-to-noise) ratio of the output signal can be improved even more.

The noise eliminating apparatus to which the present invention is applied is not limited to the above mentioned embodiment but many modifications and variations could be effected by those skilled in the art.

According to the present invention, as set forth above in detail, the video signal correlations in a plurality of ways are detected and the intermediate value of these correlation detected values is selected, so that without the necessity of detecting a moving picture element, the correlation of the optimum way can be utilized for the picture changing at any time. Accordingly, it is possible to obtain a signal separating apparatus which can improve the quality of the reproduced picture.

What is claimed is:

1. A circuit for separating the luminance and chrominance signals from a video signal which is changing with time in one or more ways relative to a picture displayed from the video signal, the circuit comprising:
a plurality of luminance and chrominance signal separating means for separating said luminance and chrominance signals from said video signal using correlations in a plurality of said ways; and
intermediate value selecting means for selecting the luminance and chrominance signals having intermediate values among the separated signals.

2. A circuit for separating the luminance and chrominance signals from a video signal as recited in claim 1 wherein
the luminance and chrominance signal separating means include a low pass filter for separating the luminance signal and a bandpass filter for separating the chrominance signal, whereby horizontal correlation is utilized for the separation.

3. A circuit for separating the luminance and chrominance signals from a video signal as recited in claim 1 wherein
the luminance and chrominance signal separating means include a delay circuit having a delay period of one horizontal line period, an adder, a subtracter, and wherein the video signal is supplied in common to the adder, the subtracter, and the delay circuit and the output of the delay circuit is supplied in common to the adder and the subtracter whereby the luminance signal is derived at the output of the adder and the chrominance signal is derived at the output of the subtracter based on vertical correlation.

4. A circuit for separating the luminance and chrominance signals from a video signal as recited in claim 3 wherein
the luminance and chrominance signal separating means include a frame memory, an adder, a subtracter, and wherein the video signal is supplied in common to the adder, the subtracter, and the frame memory and the output of the frame memory is supplied in common to the adder and the subtracter whereby the luminance signal is derived at the output of the adder and the chrominance signal is derived at the output of the subtracter based on frame correlation.

5. A circuit for separating the luminance and chrominance signals from a video signal as recited in claims 1, 2, 3, or 4 wherein each intermediate value selecting means comprises a maximum value circuit, a minimum value circuit, a first adder, a second adder and a subtracter and wherein each of the outputs of the luminance or the chrominance signal separating means is input in common to the maximum value circuit, the minimum value circuit, and the first adder, the output of the maximum value circuit and minimum value circuits are added together by the second adder, and the output of the second adder is subtracted by the subtracter from the output of the first adder to produce an output which is a separated luminance or chrominance signal having an intermediate value.

6. A circuit for separating the luminance and chrominance signals from a video signal as recited in claim 1 wherein each intermediate value selecting means comprises a plurality of N maximum value selecting circuits, where N is the number of luminance or chrominance signal separating means, and a minimum value circuit, and wherein the output of each luminance or chrominance signal separating means is input to $N-1$ of the maximum value selecting circuits so that each maximum value circuit has $N-1$ inputs, and the outputs of the maximum value circuits are input to the minimum value circuit whereby the output of the minimum value circuit is an intermediate one of the separated luminance or chrominance signals, respectively.

7. A circuit for separating the luminance and chrominance signals from a video signal as recited in claim 1 wherein each intermediate value selecting means comprises a plurality of N minimum value selecting circuits, where N is the number of luminance or chrominance signal separating means, and a maximum value circuit, and wherein the output of each luminance or chrominance signal separating means is input to $N-1$ of the minimum value selecting circuits so that each minimum value circuit has $N-1$ inputs, and the outputs of the minimum value circuits are input to the maximum value circuit whereby the output of the maximum value circuit is an intermediate one of the separated luminance or chrominance signals, respectively.

8. A circuit for separating the luminance and chrominance signals from a video signal as recited in claims 6 or 7 wherein the number N of luminance and chrominance signal separating means is three and the luminance and chrominance signal separating means utilize horizontal, vertical and frame correlation, respectively.

9. A circuit for separating the luminance and chrominance signals from a video signal as recited in claim 1 wherein the luminance and chrominance signal separating means includes a transversal filter for signal separation using the horizontal correlation.

* * * * *